2 Sheets—Sheet 1.
H. OGBORN.
Grain Separator.
No. 3,503.
Reissued June 15, 1869.
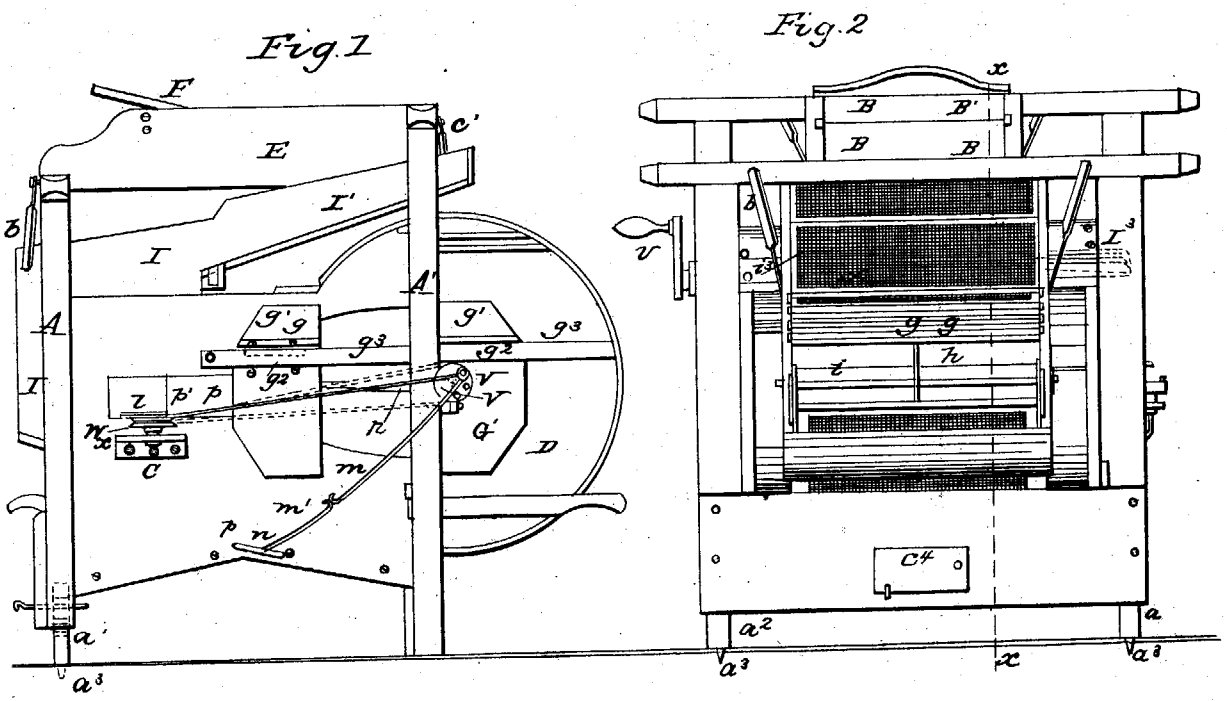
N. PETERS. Photo-Lithographer, Washington, D. C.

2 Sheets—Sheet 2.
H. OGBORN.
Grain Separator.
No. 3,503.
Reissued June 15, 1869.
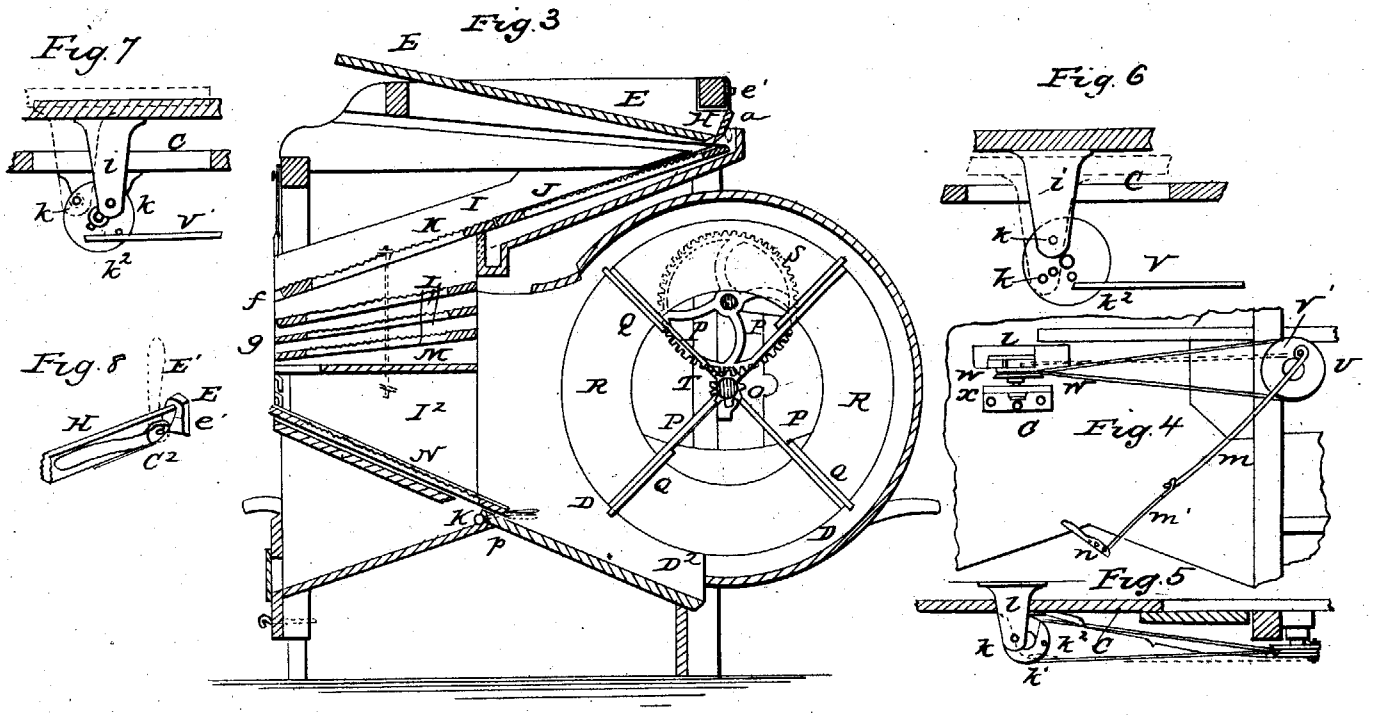
N. PETERS, Photo-Lithographer, Washington, D. C.

UNITED STATES PATENT OFFICE.

HARRISON OGBORN, OF RICHMOND, INDIANA.

IMPROVEMENT IN FANNING-MILLS, GRAIN AND SEED SEPARATORS.

Specification forming part of Letters Patent No. 70,885, dated November 12, 1867; Reissue No. 3,503, dated June 15, 1869.

DIVISION A.

*To all whom it may concern:*

Be it known that I, HARRISON OGBORN, of Richmond, in the county of Wayne and State of Indiana, have invented new and useful Improvements in a Combined Fanning-Mill, Grain and Seed Separator; and I do hereby declare the following to be a full and clear description of the same, sufficient to enable others skilled in the art to which my improvement appertains to fully understand and use the same, reference being had to the accompanying drawings, making part of this specification, in which—

Figure 1 is a side elevation of my improved machine. Fig. 2 is a front elevation of the same. Fig. 3 is a section in line *x x*, Fig. 2. Fig. 4 is a detached view of my devices for giving reciprocating motion to the screens. Fig. 5 is a top view, and Figs. 6 and 7 modifications of the same.

Similar letters indicate corresponding parts in the several figures.

The nature of my invention consists, first, in the use of a board sliding in grooves in side boards in place of the customary hopper, and in arranging an adjustable swinging end board in such a manner that the flow of the grain can be adjusted or regulated at pleasure by the position given to the same by means of a cam-lever; secondly, in combining with the apparatus for giving motion to the screens a movement for giving to the lower screen an up-and-down or jolting motion; thirdly, in providing the fan with a vertical circular partition rim, to direct the different currents of air coming in at the sides of the drum into one straight strong blast; and, lastly, in making the screens adjustable in such a way that the machine may in a few moments be so changed as to adapt itself readily to be used for cleaning either market or seed wheat, or small seeds of any kind.

A A′ in my drawings represent the upright frame of a fanning-mill supporting the cross-pieces B B′ and the sides C and drum D. Secured to the cross-pieces B B′ are the boards E, provided on their inner sides with two grooves, *e e*, in which the board F slides, and securely held together by the cross-piece G, over the top and under the bottom of which the grooves *e e* run, coming together in front at an angle, so that the board F has more of a slant in the upper groove *e* than in the lower one. Pivoted at its top to the rear of the side boards, E, at *a*, is the swinging board H, which is adjusted by a cam-lever, E′, and spur pivoted at its front side, as shown at Fig. 8.

I is a vibrating shoe, hung in the rear from the standards A by rods *b* and in front from the standards A′ by rods *c*′. The inner sides of the shoe I are provided with three different sets of grooves, the groove *f* running to the front end of the part I′ of the shoe I, the grooves *g* running to the front end of the part $I^2$ of the shoe, and the grooves *h* running the same as the groove *g*, but horizontally. The grooves, with the exception of the groove *h*, which is horizontal, converge toward each other in the rear end of the shoe. In the grooves *f* slide two screens, the front one, J, being a fine-meshed one, and the rear one, K, a coarser one, as are also the screens L, sliding in grooves *g*. The groove *h* holds a board, M, which is not as wide as the depth of the part $I^2$ of the shoe I. A screen, N, is supported at its rear end by pins on its sides, catching in ratchets *i* on the shoe, its front end resting on its bent portion *p*′ of a rod, *p*, as shown in Fig. 3. The screens K L and the board M are held in place and prevented from slipping out of their respective grooves *f*, *g*, and *h* by means of the pin *f*′, passing through the staples $f^2$ and through holes in the screen-frames. At the lower end of the part I′ of the shoe I, and resting against the front of its main part, is a sloping-bottom trough, $I^3$, across the whole width of the shoe and extending outside of the machine, shown in dotted lines (Fig. 2) and directly under the screens J, so that the small grains of wheat, chess, cockle, and other small seeds and impurities falling through the screen onto the upper grain-board are shaken into the trough and from it fall outside of the machine. The rear side board, $i^3$, of the trough $I^3$, inside of the shoe, is made adjustable by having holes in its bottom sliding or fitting on pins in the bottom of the trough at its lower side. It is also provided with holes on its inner face, corresponding in position with the holes in its bottom, so that it can be placed in a horizontal position, as shown in red lines in Fig. 3. Inside of the drum D rotates the fan, its shaft $o$ having its bearings on the standards A′ A′, and provided with arms P, to which wings Q are attached. At its center it is provided with a circular rim, R, which acts as a guide to the currents of air coming in at each side of the drum, forcing them together in one blast under and through the screens L. At one side of the fanning-mill, just inside of the drum D, is situated a gear-wheel, S, giving motion to the shaft $o$ by means of the pinion T, and operated by handle U. At the opposite side, just outside of the bearings on the standards A′, the shaft $o$ is provided with a belt-wheel, V, connected by a belt to the wheel W, which works loose on the vertical pin $w$ in the plate X, secured to the sides C. The wheel W is provided with three sets of holes $k$ $k'$ $k^2$. Into hole $k$ is placed the pin on the under side of the connecting-bar $l$, which is attached to the side of the shoe I, to which a horizontal motion is imparted when motion is given to the wheels V W.

Attached to the wrist $v$ on the wheel V is the rod $m$, linked to the rod $m'$, which is connected to the lever $n$ on the rod $p$. This rod passes into the fanning-mill to its center, and is bent horizontally to the front directly under the center of the forward end of the screen N, lifting it and allowing it to drop again, thus imparting a quick up-and-down or jolting motion to the screens, and is called a "knocker." As the lever $n$ on the rod $p$ is pressed downward, and the part $p'$ is at its lowest position, resting on the lower grain-board, $D^2$, the crank-rod $m$ is enabled to finish its revolution without pressing the part $p'$ of the rod $p$ by means of its being linked to the rod $m'$, and thus enabled to bend.

In place of the belt around the pulley-wheels W V, a rod, V′, may be used, one end pivoted on the wrist $v$, the other end of which catches in either of the holes $k'$ or $k^2$, giving either a slow or quick motion to the shoe, according as it is placed in $k'$ or $k^2$, respectively, when the machine is in operation. The end board, $C^2$, is placed across the bottom C′ of the chess-box, and is provided with an opening, $c^3$, flush with the bottom C′, and closed by door $c^4$. Through this opening the dirt, &c., may be removed when necessary. The sliding doors G′ G′ over the openings of the drum are provided with cleats $g'$ $g'$, which cleats rest on bars $G^3$. The cleats $g'$ $g'$ have small projecting points $g^2$, which stick into bars $g^3$, and thus prevent the accidental displacement of the fan-doors. To clean seed-wheat, pour the wheat into the hopper E on the slide F, on which, by reason of its being the same width of the hopper, the grain is spread out, thus delivering it in a thin wide sheet onto the screens below. The rear opening being adjusted the proper degree by means of the tooth $e'$ of the cam-lever E′ being made to catch into the rack $e^2$, the grain is free to fall onto the upper end of the vibrating screen J.

To regulate the flow of the grain, it is only necessary to raise the cam-lever E′, swing the board H nearer to or farther from the end of the slide F, and to refasten it by pushing the cam-lever E′ downward, and to feed still faster than the utmost swinging of the board H will allow, it is only necessary to draw the board F out in the grooves.

The screen J is the market-wheat screen, and as the grain is shaken down upon it most of the small wheat, chess, cockle, and other impurities pass through its meshes and fall onto the upper grain-board, I′, and are carried into the trough $I^3$, from which they are shaken to the outside of the fanning-mill, the wheat passing onto the screen K, provided with larger meshes, and falls through the same and the screens L onto the board M, (the screens K and L arresting all coarse impurities.) This board, being provided with several holes to receive the pin $f'$, can be adjusted nearer to or farther from the rear end of the shoe, so that, as the grain falls from the board onto the screen N, more or less of the impurities are carried out by the blast from the fan. The grain has now fallen onto the lowest screen, N, which is constantly shaken vertically by the rod $p$. The smaller wheat and any impurities still remaining are jolted and sifted through the meshes of the screen onto the incline bottom of the "shoe," from which it falls into the chess-box C′, while the large pure seed-wheat is carried over the screen N and bottom grain-board, $D^2$, onto the floor under the drum.

To clean market wheat, the screen N is taken out and laid aside, the screen J placed in its stead, the screen K taken out also and laid aside and the board $i^3$ of the trough $I^3$ placed in the position as shown in red lines in Fig. 3, thus forming a continuation of the upper grain-board, I′. To clean the smaller seeds, the sliding doors are shut, or nearly so, and the screen J exchanged for a finer one.

Having thus described my invention, what I claim as new therein, and desire to secure by Letters Patent, is—

1. The trough $I^3$, situated under and at the lower end of the upper grain-board, with a removable side, $i^3$, substantially as and for the purposes described.

2. The combination of the adjustable trough $I^3$ with the upper grain-board, I′, forming the bottom of the front part of the shoe I, and the adjustable screen J, substantially as and for the purposes described.

3. A hopper, consisting of the side boards, E, with converging grooves $e$, the sliding board F, and adjustable swinging board H, substantially as and for the purposes described.

4. The combination of the swinging board H, lever E, provided with a tooth or spur $e'$, and the rack $e^2$, substantially as and for the purposes described.

5. The vertical circular rim R, secured to the fan-wings Q, substantially as and for the purposes described.

6. The knocker-rod $p$, with its bent part $p'$, and the lever $n$, substantially as and for the purposes described, of giving a jolting motion to the screen.

7. The rod $p$, in combination with the linked rods $m$ and $m'$, wrist $v$, and wheel V, substantially as and for the purposes described.

8. The pins $g^2$ on the cleats of the sliding doors G′, substantially as and for the purposes described.

The foregoing specification of my improved fanning mill, grain and seed separator, signed this 7th day May, 1869.

HARRISON OGBORN.

Witnesses:
D. P. HOLLOWAY.
JAMES M. BLANCHARD.